US010996726B1

(12) United States Patent
Thompson et al.

(10) Patent No.: US 10,996,726 B1
(45) Date of Patent: May 4, 2021

(54) RUNTIME UPDATE OF BATTERY COEFFICIENTS

(71) Applicant: Dell Products, L.P., Round Rock, TX (US)

(72) Inventors: Richard C. Thompson, Cedar Park, TX (US); Vivek Viswanathan Iyer, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 16/705,014

(22) Filed: Dec. 5, 2019

(51) Int. Cl.
*G06F 1/26* (2006.01)
*H04L 29/06* (2006.01)

(52) U.S. Cl.
CPC ............ *G06F 1/26* (2013.01); *H04L 63/0428* (2013.01)

(58) Field of Classification Search
CPC ..... G06F 1/26; G06F 1/3206; H04L 63/0428; Y02E 60/10; H01M 10/4257
USPC .............................................................. 713/1
See application file for complete search history.

(56) References Cited

U.S. PATENT DOCUMENTS

| | | | |
|---|---|---|---|
| 9,263,912 B2* | 2/2016 | Verdun | H02J 7/007 |
| 9,753,749 B2* | 9/2017 | Gatson | G06F 9/44505 |
| 10,666,077 B1* | 5/2020 | Dharia | H02J 7/0047 |
| 10,671,149 B2* | 6/2020 | Grobelny | G06F 1/28 |
| 2012/0210150 A1* | 8/2012 | de Lind van Wijngaarden | G06F 1/3212 |
| | | | 713/320 |
| 2016/0046199 A1* | 2/2016 | Butler | H02J 7/00036 |
| | | | 320/106 |
| 2016/0261122 A1* | 9/2016 | Childress | H02J 7/0021 |
| 2018/0246552 A1* | 8/2018 | Thompson | G06F 11/3093 |

OTHER PUBLICATIONS

Microsoft, "Power Management Functions," 10 pages, retrieved Aug. 27, 2019, available at https://docs.microsoft.com/en-us/windows/win32/power/power-management-functions.

* cited by examiner

*Primary Examiner* — Brian T Misiura
(74) *Attorney, Agent, or Firm* — Fogarty LLP (57) ABSTRACT

Systems and methods for runtime update of battery coefficients are described. In an illustrative, non-limiting embodiments, an Information Handling System (IHS), may include: a processor; and a memory coupled to the processor, the memory having program instructions stored thereon that, upon execution, cause the IHS to: receive a battery configuration policy from a remote server; and transmit at least a portion of the policy to a battery management unit (BMU) at runtime, where the policy comprises one or more battery coefficients.

20 Claims, 4 Drawing Sheets

RUNTIME UPDATE OF BATTERY COEFFICIENTS

FIELD

The present disclosure generally relates to information handling systems (IHSs), and, more particularly, to systems and methods for runtime update of battery coefficients.

BACKGROUND

As the value and use of information continues to increase, individuals and businesses seek additional ways to process and store information. One option is an information handling system (IHS). IHSs generally process, compile, store, and/or communicate information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. Variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

SUMMARY

Embodiments of systems and methods for runtime update of battery coefficients are described. In an illustrative, non-limiting embodiment, an Information Handling System (IHS), may include: a processor; and a memory coupled to the processor, the memory having program instructions stored thereon that, upon execution, cause the IHS to: receive a battery configuration policy from a remote server; and transmit at least a portion of the battery configuration policy to a battery management unit (BMU) at runtime, wherein the battery configuration policy comprises one or more battery coefficients.

In some cases, the battery configuration policy may be received subject to a key exchange or encryption between the IHS and the remote server. For example, the battery configuration policy may include at least one of: an event-based update instruction, or a scheduled-based update instruction. The portion of the battery configuration policy may be transmitted to the BMU independently of any Basic Input/Output System (BIOS) update. Additionally, or alternatively, the battery configuration policy may be received by an operating system (OS)-level application.

To transmit the portion of the battery configuration policy to the BMU, the program instructions, upon execution, may cause the OS-level application to push the portion of the battery configuration policy to an OS service via a manageability application programming interface (API). Additionally, or alternatively, the program instructions, upon execution, may cause the OS service to push the portion of the battery configuration policy to an embedded controller (EC) service executed by an EC via a platform environmental control interface (PECI).

The EC service may be configured to wait for a scheduled time or event before transmitting the portion of the battery configuration policy to the BMU. Additionally, or alternatively, the EC service may be configured to wait for a user of the IHS to be absent from the IHS before transmitting the portion of the battery configuration policy to the BMU. Additionally, or alternatively, the EC service may be configured to wait for a user of the IHS to be present in a mid-field or in a far-field with respect to the IHS before transmitting the portion of the battery configuration policy to the BMU. Additionally, or alternatively, the EC service may be configured to transmit the portion of the battery configuration policy to the BMU at a rate proportional to a distance between a user of the IHS and the IHS.

In some cases, one or more battery coefficients may establish a maximum charging voltage or current for a battery coupled to the BMU. Moreover, the program instructions, upon execution, further cause the BMU to transmit an acknowledgement message to the remove server in response to receiving the portion of the battery configuration policy.

In another illustrative, non-limiting embodiment, a hardware memory device may have program instructions stored thereon that, upon execution by an IHS, cause the IHS to: receive, by an OS-level application, a battery configuration policy from a remote server over a secure communication channel between the IHS and the remote server; and transmit at least a portion of the battery configuration policy to a BMU at runtime, wherein the battery configuration policy comprises one or more battery coefficients, and wherein the one or more battery coefficients establishes a maximum charging voltage or current for a battery coupled to the BMU.

To transmit the portion of the battery configuration policy to the BMU, the program instructions, upon execution, may cause the OS-level application to push the portion of the battery configuration policy to an OS service via a manageability API. Additionally, or alternatively, the program instructions, upon execution, may cause the OS service to push the portion of the battery configuration policy to an EC service executed by an EC via a PECI.

In some cases, the EC service may be configured to wait for a scheduled time or event before transmitting the portion of the battery configuration policy to the BMU. Additionally, or alternatively, the EC service may be configured to wait for a user of the IHS to be absent from the IHS before transmitting the portion of the battery configuration policy to the BMU. Additionally, or alternatively, the EC service may be configured to wait for a user of the IHS to be present in a mid-field or in a far-field with respect to the IHS before transmitting the portion of the battery configuration policy to the BMU.

In yet another illustrative, non-limiting embodiment, a method may include: receiving, at an EC service of a hardware device, a battery configuration policy comprising one or more battery coefficients; and transmitting at least a portion of the battery configuration policy from the EC service to a BMU of the hardware device, at least in part, in response to the hardware device being in a modern standby (MS) state.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

The electronics industry is working to extend the useful lifetime of batteries and improve reliability. As this work progresses, it becomes desirable to not only enhance the battery management process for new batteries, but also for batteries that are deployed in products. Unfortunately, conventional battery management processes can be slow, difficult, and often depend upon the end-user choosing to perform certain component updates—e.g., updating a basic input/output system (BIOS) or other firmware in an information handing system (IHS)—which in turn results in low adoption rates.

Although various embodiments disclosed herein are discussed in the context of an IHS for ease of explanation, it should be noted that other embodiments may be implemented in any smart battery equipped with a microprocessor or controller used to monitor and/or control the battery's operation (e.g., in an otherwise "dumb" device, such as a windmill, emergency lighting, etc.).

In contrast with conventional processes, systems and methods described herein enable update of battery coefficients at runtime. The term "runtime," as used herein, refers to the operation of an IHS after booting is complete and when the operative runtime system, typically the OS and one or more applications, is attained. Particularly, embodiments described herein provide a secure, an out-of-band (OOB) runtime update process for battery coefficients independently of any BIOS updates. Cloud-based, battery configuration policy push techniques allow battery management algorithms and coefficients to be updated remotely. Moreover, these systems and methods may update all or a subset of battery coefficients, for example: (i) in response to selected events, (ii) based upon a schedule, and/or (iii) based upon context information, such as user proximity or the like.

In some cases, systems and methods described herein may account for condition changes through the efficient and dynamic control of coefficients in series of "steps" for best longevity or performance, and to preserve as much of the energy density of a battery over time as possible. As such, these systems and methods may serve to prolong IHS battery life, while enabling users to take advantage of the full battery capacity.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below.

Figure 1:
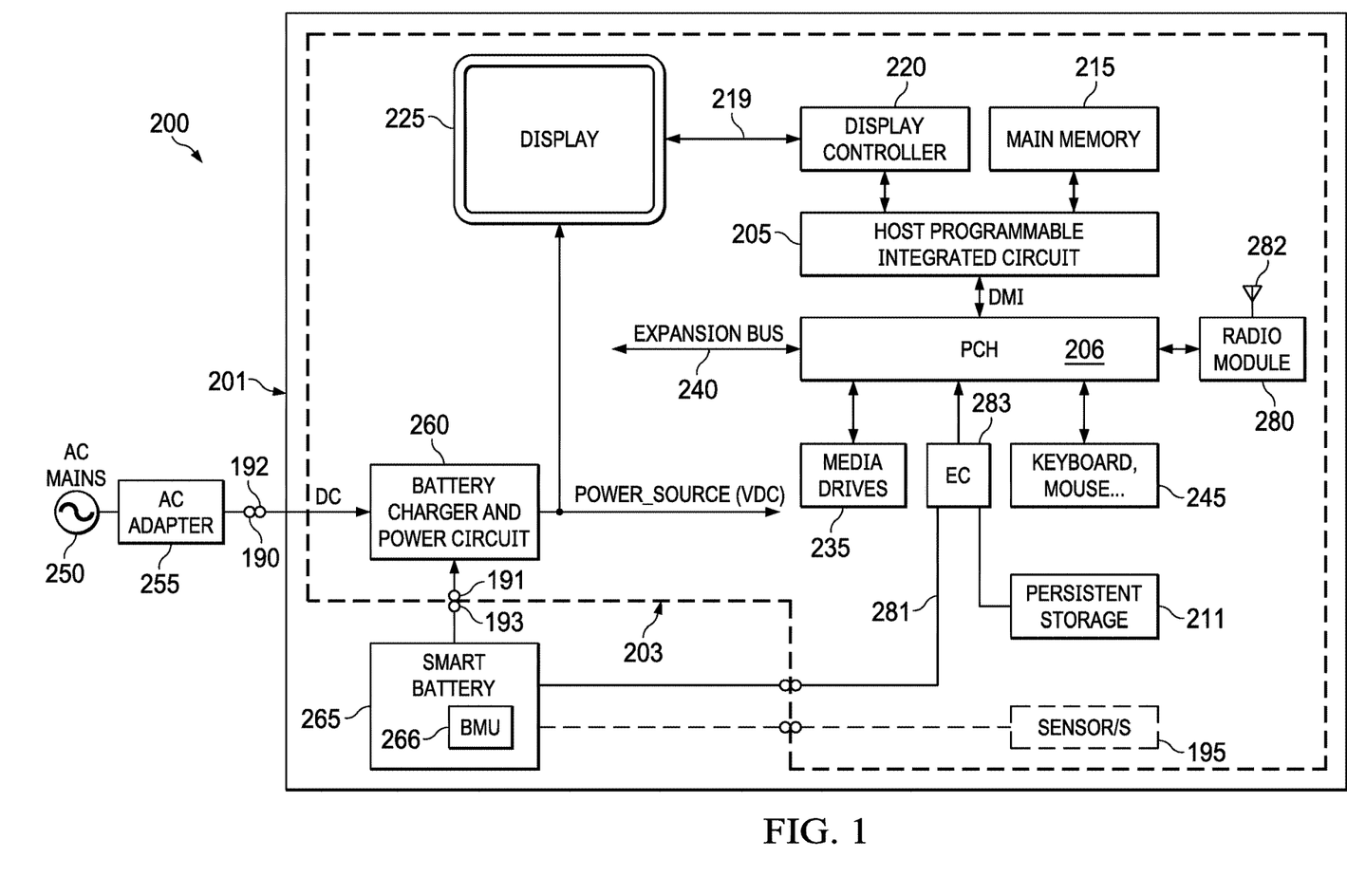
FIG. 1 illustrates an example of components of an information handling system (IHS) implementation according to some embodiments.

FIG. 1 is a block diagram of components of IHS 200 (e.g., any mobile or portable IHS such as notebook computer, laptop, MP3 player, personal data assistant (PDA), cell phone, smart phone, cordless phone, tablet computer, "2-in-1" or convertible computer, etc.), as it may be configured with various components inside of chassis enclosure 201 (e.g., tablet computer body or smartphone body, hinged notebook computer base and/or lid, etc.).

In this example, IHS 200 includes a host processing device, host processor, or host programmable integrated circuit 205 (e.g., CPU such as an Intel Pentium series processor, an Advanced Micro Devices (AMD) processor or one of many other processors currently available), which may be optionally coupled together with a platform controller hub (PCH) 206. Other examples of programmable integrated circuits 205 include any other suitable one or more programmable integrated circuits such as controller, microcontroller, microprocessor, ASIC, programmable logic device "PLD" such as FPGA, complex programmable logic device "CPLD", etc.

In the illustrated embodiment, host programmable integrated circuit 205 may be configured to execute an operating system (OS) such as Windows-based operating system, Linux-based operating system, etc. System memory 215 (e.g., DRAM) and display controller 220 may be coupled as shown to host programmable integrated circuit 205, and display device 225 (e.g., a video monitor) may be coupled to display controller 220 to provide visual images (e.g., via graphical user interface) to the user, for example, via eDP components 219 such as an eDP cable and eDP connector. Media drives 235 may be coupled to host programmable integrated circuit 205 via PCH 206 to provide permanent or non-volatile storage.

Still referring to FIG. 1, expansion bus 240 may be coupled to PCH 206 to provide IHS 200 with additional plug-in functionality. For example, expansion bus 240 may be a PCI bus, PCI Express bus, SATA bus, USB or virtually any other expansion bus. Input devices 245 (e.g., such as a keyboard, touchpad, mouse) may be coupled via PCH 206 to host programmable integrated circuit 205 to enable the user to interact with IHS 200. In other mobile applications, such as convertible computer, tablet computers, and/or smart phones, a touchscreen may additionally or alternatively be provided for both presenting a graphical user interface (GUI) and for accepting user input. Radio module 280 may be coupled to host programmable integrated circuit 205 via PCH 206, with at least one antenna element 282 coupled to radio module 280 for wireless reception and transmission (e.g. to enable wireless LAN and/or cellular data communications).

Embedded controller (EC) 280 may also be coupled to PCH 206 as shown, and may be configured to perform various tasks such as battery and power management, I/O control, etc. Persistent storage 211 (e.g., embedded and partitioned flash memory, Electrically Erasable Programmable Read Only Memory or "EEPROM," etc.) may be coupled to EC 280 for storing persistent information for EC 280.

In the particular embodiment of FIG. 1, IHS 200 is coupled to an external source of power, namely AC mains 250 through AC adapter 255. Alternatively, external power may be provided from any other suitable external source (e.g., external DC power source), or AC adapter 255 may alternatively be integrated within IHS 200 such that AC mains 250 supplies AC power directly to IHS 200.

AC adapter 255 is removably coupled to, and separable from, battery charge controller 260 of IHS 200 at mating interconnection terminals 190 and 192 in order to provide IHS 200 with a source of DC power to supplement DC power provided by battery cells of a battery system in the form of smart battery pack 265—e.g., a lithium ion (Li-ion) or nickel metal hydride (NiMH) battery pack including one or more rechargeable batteries—and battery management unit (BMU) 266 that includes, for example, an analog front end (AFE), storage (e.g., non-volatile memory) and microcontroller. Additionally, or alternatively, charge controller 260 may be controlled by the EC using an SMBus connection or the like. Battery charge controller 260 of IHS 200 may also provide DC power for recharging battery cells of battery system 265 during charging operations.

As further shown in FIG. 1, battery system data bus (SMBus) 281 may be coupled to smart battery pack 265 by interconnection terminals to provide real-time and/or stored information from BMU 266 of smart battery pack 265 to EC 280 and to other components such as programmable integrated circuit 205. In some cases, SMBus 281 may be replaced by I²C or other suitable serial communication interface.

Examples of information stored by BMU 266 may include, but are not limited to: operating conditions (e.g., battery operating conditions including battery state information such as battery current amplitude and/or current direction, battery voltage, battery charge cycles, battery state of charge, battery state of health, battery temperature, battery usage data such as charging and discharging data; and/or host system operating conditions such as processor operating speed data, system power management and cooling system settings, state of "system present" pin signal, environmental information (e.g., such as ambient temperature, relative humidity, system geolocation measured by GPS or triangulation, time and date, etc.), and event occurrences. Examples of events may include, but are not limited to: acceleration or shock events, system transportation events, exposure to elevated temperature for extended time periods, high discharge current rate, combinations of battery voltage, battery current and/or battery temperature (e.g., elevated temperature event at full charge and/or high voltage causes more battery degradation than lower voltage), etc.

In an embodiment, loss of "system present" pin signal from paired IHS 200 indicates the battery was removed (or unpaired) from the main portion 203 of IHS 200 and/or other system manipulation has occurred. As shown, BMU 266 may be coupled to one or more sensors 195.

When battery system 265 of IHS 200 is optionally provided as a replaceable smart battery pack, it may be configured for insertion (paring with main portion 203) and removal (un-pairing with main portion 203) from a corresponding battery pack compartment within chassis 201 of IHS 200 (e.g., such as plastic and/or metal enclosure of a notebook computer, tablet computer, convertible computer smart phone, etc.), and may be provided with external power and data connector terminals 193 for contacting and making temporary interconnections with mating power connector terminals and data connector terminals 191 provided within the battery pack compartment to provide power to the system load (i.e., power-consuming components) of a main portion 203 of IHS 200, as well as to exchange data and system present signal with one or more processing devices of IHS 200.

Alternatively, a smart battery pack may be a non-replaceable or permanent battery pack that is enclosed (or captured) within an IHS chassis (such as a tablet computer or smart phone). In an embodiment, external power and data connector terminals 193 of such a captured battery pack may be soldered to mating power connector terminals and data connector terminals 191 provided within the battery pack compartment.

In various embodiments, IHS 200 may include additional, fewer and/or alternative components suitable for a given application including other programmable integrated circuits such as discrete graphics processing units (GPUs), etc.

Figure 2:
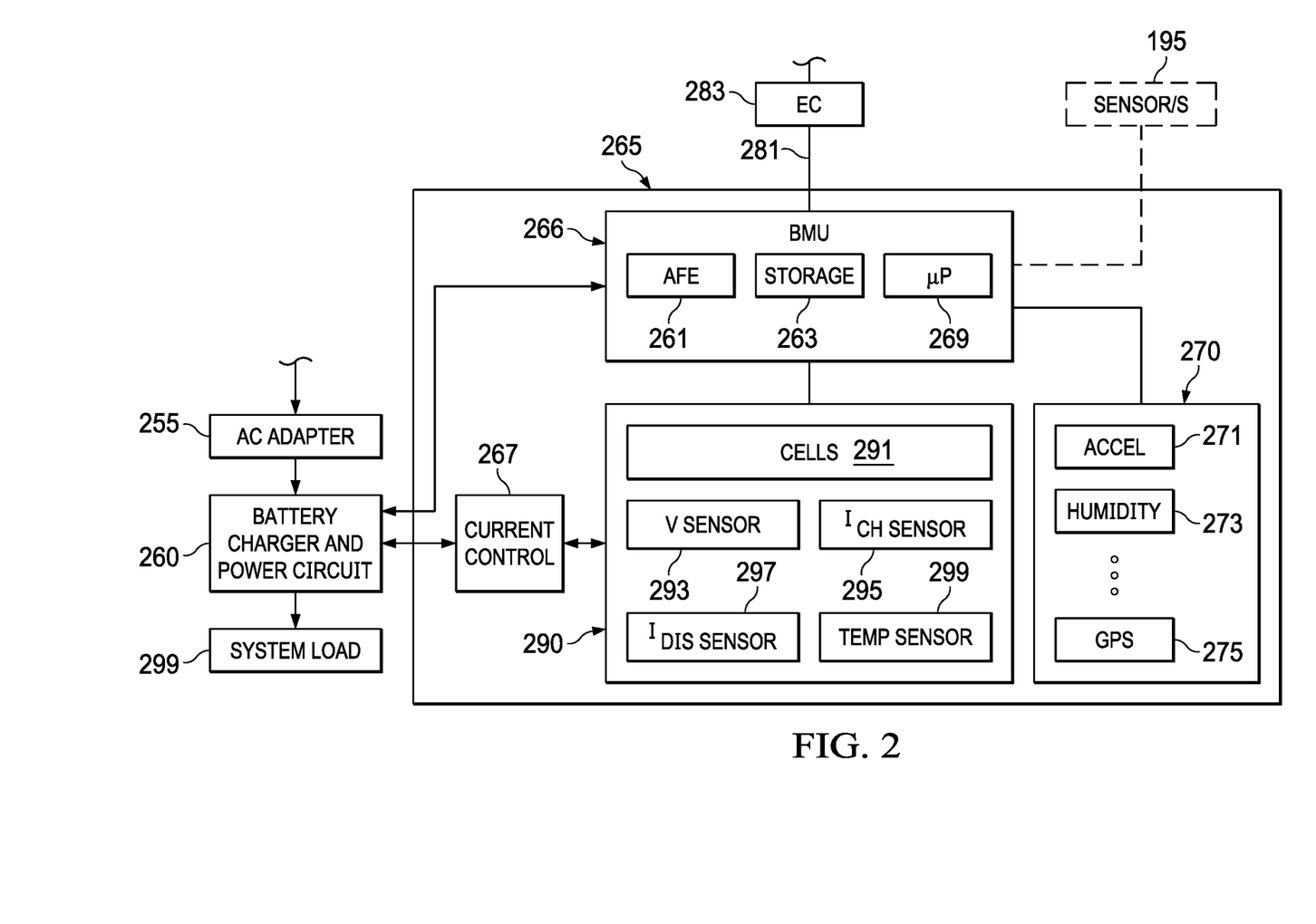
FIG. 2 illustrates an example of an IHS battery system according to some embodiments.

FIG. 2 illustrates an example of IHS battery system 265 in the form of a smart battery pack as it may be coupled to receive DC power from battery charge controller 260 during charging, and coupled to provide DC power to system load 299 (i.e., power-consuming components) of IHS 200 during battery operation. In this instance, battery system 265 may include a battery unit 290 that includes one or more rechargeable battery cells 291 as well as one or more sensors, such as temperature sensor 299, voltage sensor 293, charging current sensor 295, and a discharge current sensor 292, etc.

When at least partially charged, battery cells 291 may be configured to not only power other components of IHS 200 (i.e., when battery power/data terminals 193 are electrically connected to system power/data terminals 191), but also to power components of BMU 266 even when the remainder of the power-consuming components of IHS 200 are powered OFF and when battery pack power/data terminals 193 are not electrically connected to system power/data terminals 191.

In the embodiment of FIG. 2, battery system 265 is provided with battery current control circuitry 267 to control flow of charge current to battery cells 291 of battery pack 265, and to also control flow of discharge current from battery cells 291 of battery pack 265. In an embodiment, battery current control circuitry 267 may include charge and discharge circuitry in the form of two field effect transistors (FETs) coupled in series between battery cells 291 and battery charge controller 260 (and optional battery terminal 193). The FETs of battery current control circuitry 267 may include a charge FET switching element that forms a part of a charge circuit that is controlled by components (e.g., programmable integrated circuit 269 and/or AFE 261) of BMU 266 to allow or disallow charge current to the battery cells 291, and a discharge FET switching element that forms a part of discharge circuit that is controlled by components (e.g., programmable integrated circuit 269 and/or AFE 261) of BMU 266 to allow or disallow discharge current from the battery cells 324.

In the illustrated embodiment, temperature sensor 299, voltage sensor 293, charging current sensor 295, and discharge current sensor 292 may be respectively used to provide to BMU 266 the temperature of the battery, the voltage in the battery, and the current going through the battery during charging and discharging. Temperature sensor 299 may detect both high and low temperature conditions that may affect the battery life.

When AC adapter 255 is connected to AC mains 250, battery charger 260 charges battery cells 291 of rechargeable smart battery pack 265 as directed by programmable integrated circuit 269 (e.g., microcontroller or microprocessor) of BMU 266. Additionally, or alternatively, the charge rate may be controlled by the EC over an SMBus or the like. Although in FIG. 2 battery unit 290 includes cells 291 and sensors 293, 295, 297, and 299, cells 291 and sensors may be alternatively provisioned outside of a battery unit and coupled to BMU 266 in any other suitable manner internal or external to battery system 265.

As further shown in FIG. 2, battery system 265 may include one or more other sensors 270: integrated circuits such as accelerometer 271, humidity sensor 273, global positioning system (GPS) sensor/receiver 275, or barometric altimeter sensor or airborne particulate sensors, such as aerosol impactor or laser particle counter (not shown), etc. In other implementations, however, any one of other sensors 270 may be alternatively provisioned as sensors 195 coupled by interconnection terminals to BMU 266 but positioned outside of, or external to, battery system 265.

For example, one or more sensors 195 may be provided at any location outside of battery system 265 and within chassis enclosure 201 of IHS 200 that is suitable for sensing a given environmental parameter, such as air temperature within chassis enclosure 201, ambient air temperature external to chassis enclosure 201, relative humidity within chassis enclosure 201, ambient relative humidity external to chassis enclosure 201, airborne particulates within chassis enclosure 201, airborne particulates external to chassis enclosure 201, etc.

Still referring to FIG. 2, BMU 266 may include battery system storage 263 (e.g., storage device such as non-volatile random access memory "NVRAM," volatile or dynamic random access memory "DRAM," any other form of suitable non-volatile and/or volatile memory, etc.), as well as analog front end (AFE) 261 that are coupled to programmable integrated circuit 269. AFE 261 may be present, for example, to receive and/or condition any non-digital sensor inputs. In an embodiment, programmable integrated circuit 269 of BMU 266 may perform measurement of current and voltage, as well as calculation of current capacity of the battery and other battery-related calculations and battery charging/discharging control.

BMU programmable integrated circuit 269 may also perform measurement of environmental, system operating conditions, and/or event information using sensors of battery unit 290 and other sensors 270 and/or 195 that may be present, as well as recording or storing this measured data in storage 263 of BMU 266. However, in other embodiments, one or more other programmable integrated circuits may additionally or alternatively perform measurement of environmental, system operating conditions, and/or event information, as well as recording this information in storage 263 and/or other storage components of system 200.

Figure 3:
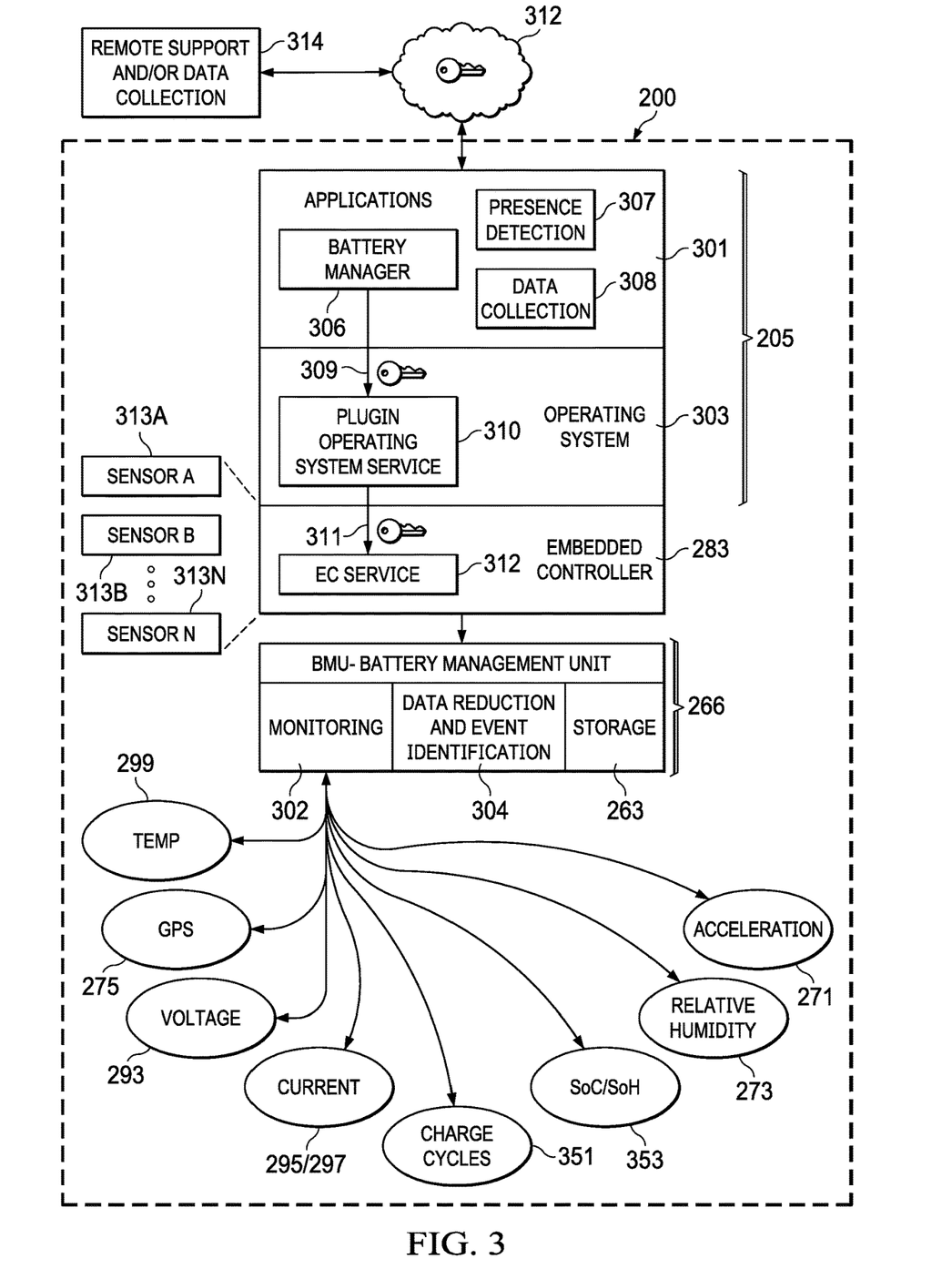
FIG. 3 illustrates an example of components of a battery management system according to some embodiments.

FIG. 3 illustrates an example of components of a battery management system. Remote support and/or data collection server 314 (or "cloud server 314") may provide cloud-based services to IHS 200, for instance, that are configured to provide battery configuration policies and/or files to IHS 200.

Applications 301 and OS 303 are executed by processor 205 of IHS 200. In this implementation, applications 301 include battery manager 306, presence detection module 307, and data collection module 308; whereas OS 303 includes OS service or plugin 310. Battery manager 306 is in communication with cloud server 314 via secure communication channel 312 and with OS service 310 via secure channel 309.

In some cases, battery manager 306 of IHS 200 may perform encrypted communications with cloud server 314 after successfully performing an encryption key or certificate exchange process. Examples of suitable key exchange processes include, but are not limited to, public key infrastructure, web of trust, etc.

A battery configuration policy may be derived or created by cloud server 314 based upon machine learning (ML), artificial intelligence (AI), or other algorithms applied to information captured by BMU 266, by other IHSs, or information otherwise available to the manufacturer of the IHS and/or battery.

Generally, a battery configuration policy may include a set of battery coefficients or parameters to be applied to BMU 266 as it manages the operation of the IHS's battery, typically with the goal to prolong battery life and/or increase performance for a particular user, based upon that user's behavior and/or context. For instance, a battery configuration policy update may allow a higher charging voltage (i.e., more useful capacity) in response to a determination that the originally selected charging voltage was unnecessarily conservative.

In some cases, a battery configuration policy may enable switching between a standard charging mode, an express charging mode, a primarily AC charging mode, an adaptive charging mode, and a custom charging mode; each of these charging modes having different settings or specifications (e.g., voltages, currents, temperatures, times, etc.) applied to the battery. Available settings may be restricted depending upon the battery. For example, possible battery settings may include, but are not limited to:

(a) Standard: Fully charges the battery at a moderate rate. This setting provides a balanced approach to extending battery life while still providing a reasonably fast charging time. Recommended for users who frequently switch between battery and external power sources.

(b) Express: Quickly charges the battery using DELL's fast-charge technology. Recommended for users who need the battery to charge quickly. If the system is powered on, then the battery typically charges to 80 percent within one hour and 100 percent in two hours. Charge time may be longer if the system is powered on (may cause battery health to diminish more quickly than other settings).

(c) Primarily AC: Extends battery life by lowering the charge threshold, so that the battery never charges to 100 percent capacity. Recommended for users who primarily operate the system while plugged into an external power source.

(d) Adaptive: Automatically optimizes battery settings based on the user's typical patterns. Recommended for users who want to "set it and forget it."

(e) Custom: User selects when the battery starts and stops charging. Recommended for advanced users.

To illustrate the operation of these settings, consider an example where a user discharges a battery to a low state of charge, and plugs IHS 200 in when it issues a low-battery alarm. Then, the user unplugs IHS 200 from the AC mains before battery is fully charged: these are behaviors of opportunity charging, and someone who needs a fast charge.

Consider yet another example of a user who spends most of its time with his or her IHS 200 directly plugged into an AC source. When the user employs the battery, they do shallow discharges and plug back the IHS with battery still charge to 30% or more, or perhaps they simply almost never let the battery discharge below 30%. Then, the user charges back the battery to full: these area behaviors of desktop replacement or shallow discharge user, and they benefit from battery lifespan control. In this case, techniques described herein may be employed, for example, to lower the top of charge, charge at normal speed, delay or prevent top ups, etc.

Still referring to FIG. 3, a battery configuration policy may further include predetermined events, conditions (e.g., user absent), and/or a schedule that dictate when a given battery coefficient (or set of coefficients) should be applied to BMU 266. For instance, a battery configuration policy may be transmitted from cloud server 314 to battery manager 306 in the form of an XML file or the like over secure channel 312. At least a portion of the battery configuration policy (e.g., a subset of coefficients) may be pushed by battery manager 306 to OS service 310 via secure channel 309.

EC 283 executes EC service 312, which is in communication with OS service 310 via yet another secure channel 311 and it is configured to receive the portion of the battery configuration policy from OS service 310 therethrough. For example, EC service 312 may perform encrypted communications with OS service 310 after successfully performing a key or certificate exchange process. EC service 312 may also be configured to receive and process contextual sensor information received from IHS sensors 313A-N (e.g., proximity sensors, optical sensors, infrared sensors, sonar sensors, hinge/angle sensors, lid/hall sensors, etc.) and to push at least a portion of a battery configuration policy received through channels 312, 309, and 311 to BMU 266. In some cases, EC 283 may cooperate with present detection module 307 to determine a status of the user with respect to IHS 200.

For example, EC service 312 and/or presence detection module 307 may process user presence data received by one or more of sensor modules 313A-N and may determine, for example, whether an IHS's end-user is present or absent. Moreover, in cases where the end-user is present before the IHS, EC service 312 and/or presence detection module 307 may further determine a distance of the end-user from the IHS continuously or at pre-determined time intervals. The detected or calculated distances may be used by EC service 312 and/or presence detection module 307 to classify the user as being in the IHS's near-field (user's position <threshold distance A), mid-field (threshold distance A<user's position <threshold distance B, where B>A), or far-field (user's position >threshold distance C, where C >B).

In some cases, EC service 312 and/or battery manager 306 may receive IHS context information using sensors 313A-N including one or more of, for example: user's presence state (e.g., present, near-field, mid-field, far-field, absent), lid state (e.g., of laptop), hinge angle (e.g., between a display portion and a keyboard portion of the IHS), IHS movement (e.g., from an accelerometer or gyroscopic sensor), software application(s) under execution, and meeting/conference information obtained from a calendaring application executed by the IHS. Examples of meeting or conference information include, but are not limited to: a duration, a location, and/or the IHS's user's role (e.g., participant, presenter, manager, executive, etc.). Moreover, EC service 312 may be configured to push battery coefficient updates to BMU 266 based upon this and other contextual information. In some cases, the communication channel or bus between EC 312 and BMU 266 may also be secured by a key exchange protocol or the like.

Within BMU 266, monitoring module 302 may be configured to perform operations such as, for example: using a battery gas gauge to monitor battery charge cycles 351, determining the state of charge (SoC) and/or battery cell state of health (SoH) 353, and/or other monitored parameters such as: impedance, whether the battery cell SoC is present, the battery cell capacity/full battery cell charge capacity, and full battery cell charge capacity/design.

Storage 263 of BMU 266 may be present to store recorded environmental, system operating and/or event information which in an embodiment may be provided by data reduction and/or event identification tasks 304 performed by programmable integrated circuit 269. Data reduction tasks may include, for example: processing and/or transforming data received or derived in real time from sensors (e.g., such as one or more of the sensors illustrated and described in relation to FIGS. 2 and 3) into a data form for further processing, recording in storage 263 of BMU 266 (e.g., as part of a BMU exception log), and/or exporting from BMU 266 to other components of system 200, such as embedded controller (EC) 283, host programmable integrated circuit 205, etc.

Data reduction tasks may include performing one or more operations on monitored sensor data including, but not limited to, upscaling, editing, sorting, coding, collating, tabulating, summarizing, smoothing, interpolation, etc. Event identification tasks may include inspecting or reviewing reduced data that is recorded on battery system storage 263 to determine if one or more predefined event types have occurred by comparing environmental, system operating and/or event information to predefined exception event criteria, that may be stored in storage 263. Any identified exception events may be recorded in a BMU exception log on storage 263 by event reduction and event identification logic 304.

In some embodiments, the severity of each identified event may also be optionally categorized by event reduction and event identification logic 304 and recorded in a BMU exception log on storage 263. For example, a sensed battery temperature of greater than 75° C. for a defined extended duration of time (e.g., for greater or equal to five minutes) may be predefined as a high severity exception event, whereas a sensed battery temperature of greater than 75° C. for less than the defined extended duration of time may be predefined as a low severity exception event.

Additionally, or alternatively, certain exception events may be pre-designated for diagnostic testing with a diagnostic flag (e.g., "1"), while other type of events are designated with a no-diagnostic flag (e.g., "0") to allow normal booting. It will be understood that it is alternatively possible that severity of a given exception event may be determined by another programmable integrated circuits of IHS 200, such as EC 283 and/or host programmable integrated circuit 205, based on information provided in a BMU log. In some cases, data stored in storage 263 portion of BMU 266 may also be stored by data collection module 308.

In various embodiments, storage 263 of BMU 266 may also be configured to store battery coefficients received from off-host remote entities or cloud server 314, for instance. Examples of battery coefficients include, but are not limited to: charge rate, discharge rate, top-of-charge voltage, overcharge tolerance, end of discharge voltage, charge cutoff voltage, discharge cutoff voltage, temperature compensation, cold cranking current, etc. In many cases, BMU 266 may use these battery coefficients to control the performance and behavior of the battery.

BMU 266 may be configured to provide information stored on battery system storage 263 to one or more other programmable integrated circuits (e.g., EC 283, host programmable integrated circuit 205, etc.) of IHS 200. Moreover, information may be provided to off-host remote entities or cloud server 314 (e.g., such as computer servers executing corporate or manufacturer/fabricator/supplier support programs, system administrator, monitoring systems, etc.) across network 312 (e.g., Internet, corporate intranet, etc.).

In some embodiments, collected data and/or other information may be aggregated with other system information (e.g., CPU data, EC data, etc.) that is passed off-host to remote entities or cloud server 314 for analysis. Such off-host remote entities or cloud server 314 may take one or more actions, for example, based on this information, and/or it may record the provided information for future analysis.

Figure 4:
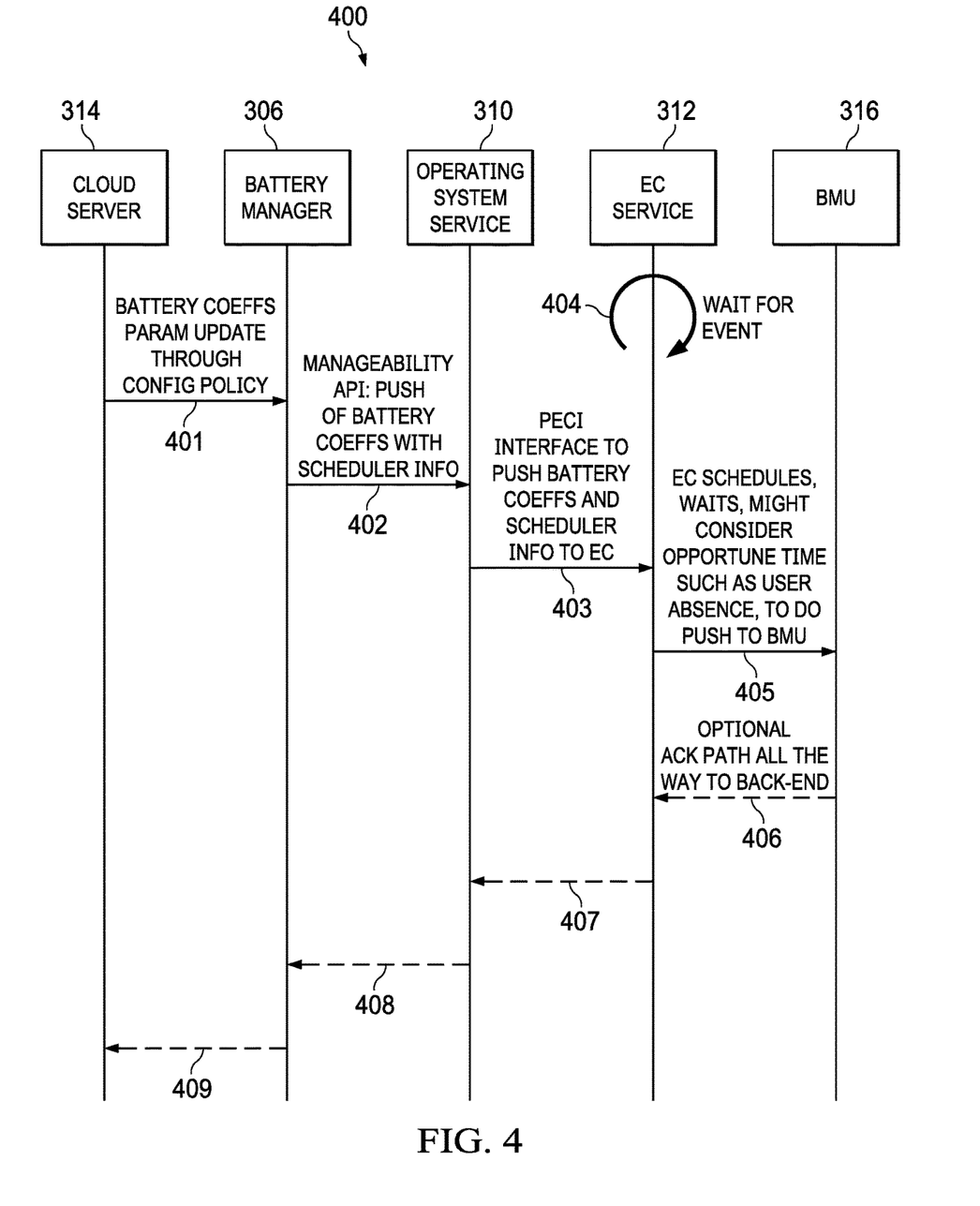
FIG. 4 illustrates an example of a method for updating battery coefficients at runtime according to some embodiments.

FIG. 4 illustrates an example of method 400 for updating battery coefficients at runtime. In various embodiments, method 400 may be executed through the cooperation among cloud server 314, battery manager 306, OS service 310, EC service 312, and BMU 266. Particularly, at 401, cloud server 314 provides battery configuration parameter updates to battery manager 206 executed by IHS 200 at runtime via a battery configuration policy or file. At 402, battery manager 306 pushes at least a portion of the battery configuration policy (e.g. battery coefficients or parameters, and update schedules or event triggers) to OS service 310 via a manageability application programming interface (API) or the like.

At 403, OS service 310 pushes the portion of the battery configuration policy to EC service 403 over a platform environmental control interface (PECI) interface. Then, at 404, EC service 312 monitors whether event data received from BMU 266, sensors 313A-N, and/or presence detection module 307 indicates that an actionable event has taken place. Additionally, or alternatively, EC service 312 may wait for scheduled update time, as prescribed by the battery configuration policy, to push the policy to BMU 266.

For example, at 404, EC service 312 may wait for a user of IHS 200 to be absent before pushing the portion of the battery configuration policy to BMU 266. Additionally, or alternatively, EC service 312 may wait for the user to be present in mid-field or in far-field before pushing the portion of the battery configuration policy to BMU 266. Additionally, or alternatively, EC service 312 may push the portion of the battery configuration policy to the BMU at a data rate and/or in amounts proportional to a distance between the user and the IHS. Additionally, or alternatively, EC service 312 may wait for the user to close a lid of IHS 200 before pushing the portion of the battery configuration policy to BMU 266 In some cases, battery coefficients in a battery configuration policy may include a priority or severity attribute, such that EC service 312 pushes coefficients associated with higher priority attributes before pushing other coefficients having lower priority attributes to BMU 266.

At 405, EC service 312 pushes the portion of the battery configuration policy to BMU 316 after the scheduled time or waited-for event. In some implementations, in response to receiving the battery configuration policy update, BMU 266 may send acknowledgment message 406 to EC service 312, EC service 312 may send acknowledgment message 407 to OS service 410, OS service 410 may send acknowledgment message 408 to battery manager application 306, and battery manager application 306 may send acknowledgment message 409 to cloud server 314.

In other embodiments, a hardware device other than IHS 200 described in FIG. 1 may implement systems and methods described herein. For example, in some cases, a service executed by a microprocessor or controller of any hardware device and/or smart battery may receive a battery configuration policy comprising one or more battery coefficients (e.g., from a remote service over a network). Then, the service may transmit at least a portion of the battery configuration policy from the microprocessor or controller to a battery management unit (BMU) of the hardware device or smart battery. In some cases, the transmission and/or update of coefficients may be performed, at least in part, in response to the hardware device being in a modern standby (MS) state.

In MS, the hardware device may use the Advanced Configuration and Power Interface (ACPI)'s S0 low-power idle model. MS has the flexibility to configure the default behavior to limit network activity while in the low power state, such that the device wakes up when there is real-time action required, and it applies to IHSs such as laptops, tablets, smart phones, video game consoles, etc. When in the lowest power state (S0), the hardware device may have its processor(s) powered off and its memory in self-refresh. Moreover, the transition from an active to a low-power state may take a series of steps to lower-power consumption. Accordingly, in some cases, a service may receive a battery configuration policy prior to entering MS and it may apply coefficients or parameters from the policy to the battery in response to the device entering MS.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
a processor; and
a memory coupled to the processor, the memory having program instructions stored thereon that, upon execution, cause the IHS to:
receive a battery configuration policy from a remote server; and
transmit at least a portion of the battery configuration policy to a battery management unit (BMU) at runtime, wherein the battery configuration policy is received by an operating system (OS)-level application configured to push the portion of the battery configuration policy to an OS service via a manageability application programming interface (API), and wherein the battery configuration policy comprises one or more battery coefficients.

2. The IHS of claim 1, wherein the battery configuration policy is received subject to a key exchange or encryption between the IHS and the remote server.

3. The IHS of claim 1, wherein the battery configuration policy further comprises at least one of: an event-based update instruction, or a scheduled-based update instruction.

4. The IHS of claim 1, wherein the portion of the battery configuration policy is transmitted to the BMU independently of any Basic Input/Output System (BIOS) update.

5. The IHS of claim 1, wherein the program instructions, upon execution, further cause the OS service to push the portion of the battery configuration policy to an embedded controller (EC) service executed by an EC via a platform environmental control interface (PECI).

6. The IHS of claim 5, wherein the EC service is configured to wait for a scheduled time or event before transmitting the portion of the battery configuration policy to the BMU.

7. The IHS of claim 5, wherein the EC service is configured to wait for a user of the IHS to be absent from the IHS before transmitting the portion of the battery configuration policy to the BMU.

8. The IHS of claim 5, wherein the EC service is configured to wait for a user of the IHS to be present in a mid-field or in a far-field with respect to the IHS before transmitting the portion of the battery configuration policy to the BMU.

9. The IHS of claim 5, wherein the EC service is configured to transmit the portion of the battery configuration policy to the BMU at a rate proportional to a distance between a user of the IHS and the IHS.

10. The IHS of claim 1, wherein the one or more battery coefficients establish at least one of: a maximum charging voltage, or a maximum charging current.

11. The IHS of claim 1, wherein the program instructions, upon execution, further cause the BMU to transmit an acknowledgement message to the remote server in response to receiving the portion of the battery configuration policy.

12. A hardware memory device having program instructions stored thereon that, upon execution by an Information Handling System (IHS), cause the IHS to:
receive, by an operating system (OS)-level application, a battery configuration policy from a remote server over a secure communication channel between the IHS and the remote server; and
transmit at least a portion of the battery configuration policy to a battery management unit (BMU) at runtime, at least in part, by pushing, by the OS-level application, the portion of the battery configuration policy to an OS service via a manageability application programming interface (API), wherein the battery configuration policy comprises one or more battery coefficients, and wherein the one or more battery coefficients establishes a maximum charging voltage or current for a battery coupled to the BMU.

13. The hardware memory device of claim 12, wherein the program instructions, upon execution, further cause the OS service to push the portion of the battery configuration policy to an embedded controller (EC) service executed by an EC via a platform environmental control interface (PECI).

14. The hardware memory device of claim 13, wherein the EC service is configured to wait for a scheduled time or event before transmitting the portion of the battery configuration policy to the BMU.

15. The hardware memory device of claim 13, wherein the EC service is configured to wait for a user of the IHS to be absent from the IHS before transmitting the portion of the battery configuration policy to the BMU.

16. The hardware memory device of claim 13, wherein the EC service is configured to wait for a user of the IHS to be present in a mid-field or in a far-field with respect to the IHS before transmitting the portion of the battery configuration policy to the BMU.

17. A method, comprising:
receiving a battery configuration policy from a remote server; and
transmitting at least a portion of the battery configuration policy to a battery management unit (BMU) at runtime, wherein the battery configuration policy is received by an operating system (OS)-level application configured to push the portion of the battery configuration policy to an OS service via a manageability application programming interface (API), and wherein the battery configuration policy comprises one or more battery coefficients.

18. The method of claim 17, wherein the portion of the battery configuration policy is transmitted to the BMU independently of any Basic Input/Output System (BIOS) update.

19. The method of claim 17, wherein the battery configuration policy further comprises at least one of: an event-based update instruction, or a scheduled-based update instruction.

20. The method of claim 17, wherein the one or more battery coefficients establish at least one of: a maximum charging voltage, or a maximum charging current.

* * * * *